(12) United States Patent
Dempster et al.

(10) Patent No.: US 7,467,205 B1
(45) Date of Patent: Dec. 16, 2008

(54) SYSTEMS AND METHODS FOR IDENTIFYING THE CLIENT APPLICATIONS OF A NETWORK

(75) Inventors: Ronald A. Dempster, Mount Airy, MD (US); Nigel Houghton, Springfield, IL (US)

(73) Assignee: Sourcefire, Inc., Columbia, MD (US)

( * ) Notice: Subject to any disclaimer, the term of this patent is extended or adjusted under 35 U.S.C. 154(b) by 403 days.

(21) Appl. No.: 11/272,033

(22) Filed: Nov. 14, 2005

Related U.S. Application Data

(63) Continuation of application No. 10/843,373, filed on May 12, 2004.

(60) Provisional application No. 60/469,395, filed on May 12, 2003.

(51) Int. Cl.
*G06F 15/173* (2006.01)
(52) U.S. Cl. .................. 709/224; 713/201
(58) Field of Classification Search ......... 709/223–224; 702/186; 713/201
See application file for complete search history.

(56) References Cited

U.S. PATENT DOCUMENTS

| | | | |
|---|---|---|---|
| 5,901,307 A | 5/1999 | Potter et al. ............ 712/240 |
| 6,199,181 B1 | 3/2001 | Rechef et al. ............ 714/38 |
| 6,334,121 B1 | 12/2001 | Primeaux et al. ............ 706/62 |
| 6,393,474 B1 | 5/2002 | Eichert et al. ............ 709/223 |
| 6,499,107 B1 * | 12/2002 | Gleichauf et al. ............ 726/23 |
| 6,678,824 B1 | 1/2004 | Cannon et al. ............ 726/22 |
| 6,754,826 B1 | 6/2004 | Challener et al. ............ 713/182 |
| 7,032,114 B1 | 4/2006 | Moran ............ 713/187 |
| 7,073,198 B1 | 7/2006 | Flowers et al. ............ 726/25 |
| 7,076,803 B2 * | 7/2006 | Bruton et al. ............ 726/23 |
| 7,152,105 B2 * | 12/2006 | McClure et al. ............ 709/224 |
| 7,257,630 B2 | 8/2007 | Cole et al. ............ 709/224 |
| 7,310,688 B1 | 12/2007 | Chin ............ 709/252 |
| 2002/0035639 A1 | 3/2002 | Xu ............ 709/238 |
| 2002/0083344 A1 * | 6/2002 | Vairavan ............ 713/201 |
| 2003/0083847 A1 * | 5/2003 | Schertz et al. ............ 702/186 |
| 2003/0101353 A1 * | 5/2003 | Tarquini et al. ............ 713/200 |
| 2004/0123153 A1 | 6/2004 | Wright et al. ............ 713/201 |
| 2005/0005169 A1 * | 1/2005 | Kelekar ............ 713/201 |

OTHER PUBLICATIONS

Office Action issued by the U.S. Patent and Trademark Office on Jan. 10, 2008 in connection with parent U.S. Appl. No. 10/843,373.

(Continued)

*Primary Examiner*—Frantz B Jean
(74) *Attorney, Agent, or Firm*—Posz Law Group, PLC

(57) ABSTRACT

A packet transmitted on a network is read and decoded. A network device and its operating system are identified by analyzing the decoded packet. If more than one operating system is identified from the decoded packet, the operating system is selecting by comparing confidence values assigned to the operating systems identified. A client application running on the network device is identified from the decoded packet or subsequent packets that are read, decoded and analyzed. The network topology of a network is determined by reading, decoding, and analyzing a plurality of packets. A flow between two network devices is determined by reading, decoding, and analyzing a plurality of packets. Vulnerabilities are assigned to operating systems and client applications identified by reading, decoding, and analyzing packets. Network configuration policy is enforced on operating systems and client applications identified by reading, decoding, and analyzing packets.

20 Claims, 17 Drawing Sheets

OTHER PUBLICATIONS

Office Action issued on Feb. 5, 2008 in connection with the related U.S. Appl. No. 10/843,375.

Spitzner, Lance; Passive Fingerprinting, May 3, 2003; Focus on Intrusion Detection; pp. 1-4; obtained from http://www.ctillhq.com/pdfdb/000183/data.pdf.

Lyon, Gordon; Remote OS detection via TCP/IP Stack Fingerprinting, Jun. 30, 2002; pp. 1-12; obtained from: http://web.archive.org/web/20021017063625/www.insecure.org/nmap/nmap-fingerprinting-article.html.

Office Action issued on Mar. 12, 2008 in connection with the related U.S. Appl. No. 10/843,459.

* cited by examiner

```
04/09-10:26:38.963207 10.1.1.51:49778 -> 10.1.1.4:23
TCP TTL:64 TOS:0x10 ID:56353 IpLen:20 DgmLen:60 DF
******S* Seq: 0x4DDB2782  Ack: 0x0  Win: 0x8000  TcpLen: 40
TCP Options (6) => MSS: 1460 NOP WS: 0 NOP NOP TS: 247009412 0

04/09-10:26:38.963534 10.1.1.4:23 -> 10.1.1.51:49778
TCP TTL:64 TOS:0x0 ID:815 IpLen:20 DgmLen:44 DF
***A**S* Seq: 0x752B739B  Ack: 0x4DDB2783  Win: 4470  TcpLen: 24
TCP Options (1) => MSS: 1460
```

FIG. 3

SYSTEMS AND METHODS FOR IDENTIFYING THE CLIENT APPLICATIONS OF A NETWORK

CROSS-REFERENCE TO RELATED APPLICATION

This application claims the benefit of U.S. application Ser. No. 10/843,373, filed May 12, 2004, titled "Systems and Methods for Identifying the Services of a Network," which is herein incorporated by reference in its entirety.

FIELD OF THE INVENTION

Embodiments of the present invention relate to systems and methods for determining the characteristics of a computer network. More particularly, embodiments of the present invention relate to systems and methods for automatically and passively determining a host configuration of a computer network.

BACKGROUND

Computers and computer networks connecting such computers are vital components of modern society. Unfortunately, such computer networks are susceptible to attacks from internal and external hostile sources. Intrusion detection systems (IDSs) are used to prevent such attacks. Conventional IDSs operate by analyzing network traffic in terms of the traffic itself. They do not, however, consider the end points of that traffic. End points refer to the originators and recipients of message traffic. Such end points include, for example, clients and the servers. Analysis of end points can provide contextual information about the network such as host addresses and client applications. By not considering these end points, a vital piece of contextual information about the network is missed. Consequently, a substantial need exists for technologies that provide information about the end points of computer network traffic.

IDSs are less effective than they could be because they do not have contextual information about the computer network they are monitoring. For example, without contextual information, IDSs are susceptible to a computer network attack known as evasion. Evasion occurs when an attacker uses network endpoint information that the IDS does not have, to evade detection by the IDS.

A known method of evasion is insertion. Insertion can be used in networks having a routing infrastructure that handles packets of different sizes. For example, a routing link (router or some other device) may be attached to a network that supports a 1500 byte maximum size on one side of the device and 500 bytes on the other. If someone was trying to talk to a host on the other side of the device, the maximum packet size they could send is 500 bytes. This maximum is called the "Path MTU" (Maximum Transfer Unit). If an attacker knows this, they can transmit a large packet between two properly sized packets and get the IDS to accept the oversized packet, giving the IDS a bad model of the data that is actually arriving at the host.

Not only does the lack of contextual information make the IDS more susceptible to attack, but it also makes the IDS less efficient. One such inefficiency is that, without contextual information, the IDS may not be able to discern whether or not an attack will cause harm. Attacks can be directed to a particular client application running on a target host. Without information about the client applications running on the target host, an IDS could mistakenly detect an attack even if that host is not running the targeted client application. That is, the IDS would cause an alarm even though the attack would be harmless. Such an event is called a false positive. Large numbers of false positives can make it more difficult and expensive to locate genuine attacks that can harm a host on the network.

Some conventional techniques for providing contextual information to IDSs are known. One such technique is for a human to audit each host manually and gather all desired contextual information. This manual method has a number of disadvantages including that it is time consuming, prone to error, and makes maintenance more difficult. One reason for these drawbacks is that networks are dynamic in nature. Host computers in computer networks are added, removed, and reconfigured. If these changes are not meticulously documented, each computer on the network must be revisited periodically to insure that the contextual information is up to date.

Another conventional technique for providing contextual information to an IDS is an automatic discovery system. Conventional automatic discovery systems are active scanning systems that actively probe end hosts on a computer network and perform stimulus response tests on them to find and record vulnerabilities that exist on end hosts. Though not manual, active scanning systems also suffer from several problems. One problem is that active scanning can be destructive to the network. In testing for vulnerabilities, they can cause both routers and servers to malfunction or stop functioning. Another problem is that they may not provide information useful to an IDS because in many instances a one-to-one mapping does not exist between the information an active scanner provides and the information an IDS can use. Another problem is that active scanners only provide a snapshot of the network at the time when the scan is performed. This snapshot is problematic because a host may run a vulnerable client application transiently. In such a case, the active scanning may be performed at a time when the vulnerable client application is not running. As a result, the active scan would not cause an alarm despite the transient nature of the vulnerability.

In view of the foregoing, it can be appreciated that a substantial need exists for systems and methods that can advantageously provide a user interface for modifying an automatically and passively determined host configuration of a computer network.

SUMMARY OF THE INVENTION

One embodiment of the invention includes a method for passively and automatically identifying a client application running on a network device of a network by reading a packet transmitted by the network device on the network, decoding the packet into one or more protocol fields, comparing the one or more fields to a client application identifying data structure, and storing a matched client application as the client application running on the network device.

Another embodiment of the invention includes a method for passively and automatically identifying a client application running on a network device of a network by identifying a flow between an initiator network device and a responder network device by reading, decoding, and analyzing two or more packets transmitted on the network, identifying one or more packets of the flow as one or more initiator packets, identifying one or more packets of the flow as one or more responder packets, and if protocol fields of the one or more initiator packets match initiator protocol fields of the client application and if protocol fields of the one or more responder packets match responder protocol fields of the client application, then identifying the client application running on one of the initiator network device and the responder network device.

Another embodiment of the invention includes a method for passively and automatically identifying a client application running on a network device of a network by maintaining a client application identifying data structure that comprises one or more protocol fields for one or more client applications, identifying a flow between an initiator network device and responder network device by reading, decoding, and analyzing two or more packets transmitted on the network, comparing one or more protocol fields of one or more packets of the flow to the one or more protocol fields of the one or more client applications of the client application identifying data structure, and recording a matching client application as the client application of the initiator network device.

Another embodiment of the invention includes an apparatus for passively and automatically identifying a client application running on a network device of a network including a receiver for receiving a packet transmitted by the network device on the network, a decoder for decoding the packet into one or more protocol fields, a processor for comparing the one or more fields to a client application identifying data structure, and a computer-readable medium for storing a matched client application as the client application running on the network device.

BRIEF DESCRIPTION OF THE DRAWINGS

FIG. 3 shows portions of two exemplary packets that can be decoded, in accordance with one embodiment.

Figure 1:
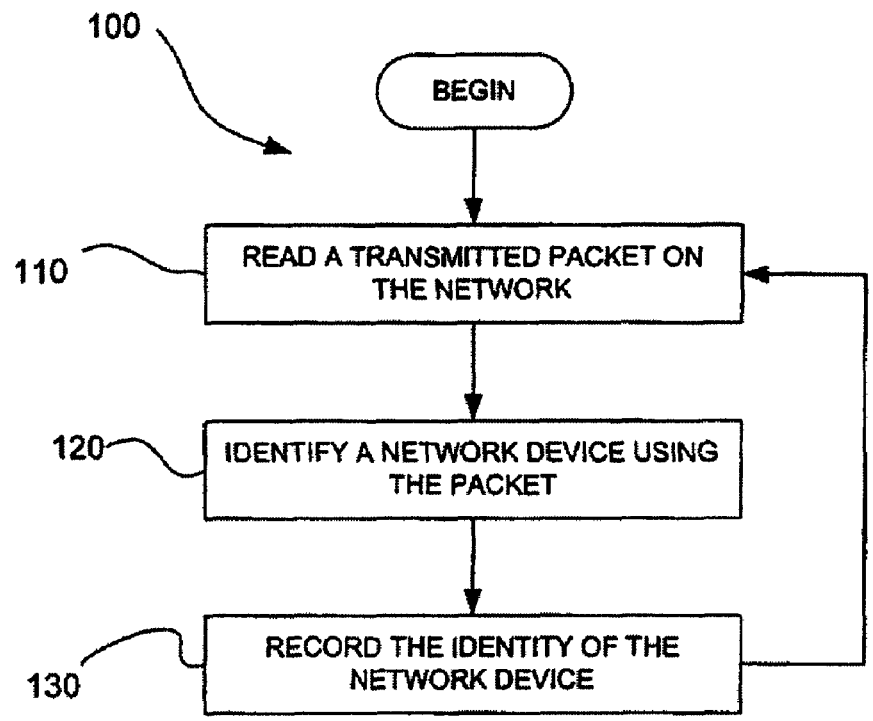
FIG. 1 is a flowchart showing a method for automatically and passively determining the characteristics of a network in accordance with one embodiment.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Embodiments of systems and methods for automatically and passively determining the characteristics of a network are described in this detailed description. In this detailed description, for purposes of explanation, numerous specific details are set forth to provide a thorough understanding of embodiments of the present invention. One skilled in the art will appreciate, however, that embodiments may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

Embodiments of the present invention are automatic, passive network discovery systems. These systems are passive because they examine packets moving across a network; they do not perform active scans. They are automatic because they require little or no human intervention. Some embodiments operate by performing functions including: (1) identifying network devices on a network; (2) identifying operating systems and client applications running on network devices (in some cases, with some level of assurance); (3) recording, in real-time, changes occurring on the network; and (4) gathering this information in a format that can be used by a network reporting mechanism. Exemplary network reporting mechanisms include IDSs and NMSs.

Some embodiments examine packets moving across a network in real-time for characteristic information about the network. One such type of characteristic information is information related to a network device, or host, on the network. One skilled in the art will appreciate that a network device is any device with a network connection. Network devices include but are not limited to computers, printers, switches, game machines, and routers.

FIG. 1 is a flowchart showing a method 100 for automatically and passively determining the characteristics of a network in accordance with one embodiment.

In step 110 of method 100, a packet transmitted on a network is read.

In step 120, a network device is identified using the packet. A network device includes but is not limited to a computer, a printer, and a router. One skilled in the art will appreciate that a network device can also be referred to as a host.

In step 130, the identity of the network device is recorded. The identity is stored as a data structure in a file or database, for example. If a packet identifies a network device that has previously been recorded, the current information and the previous information are compared and any changes are recorded. If no changes have been found, no new information is recorded. In either case, method 100 returns to step 110 to read the next packet.

Figure 2:
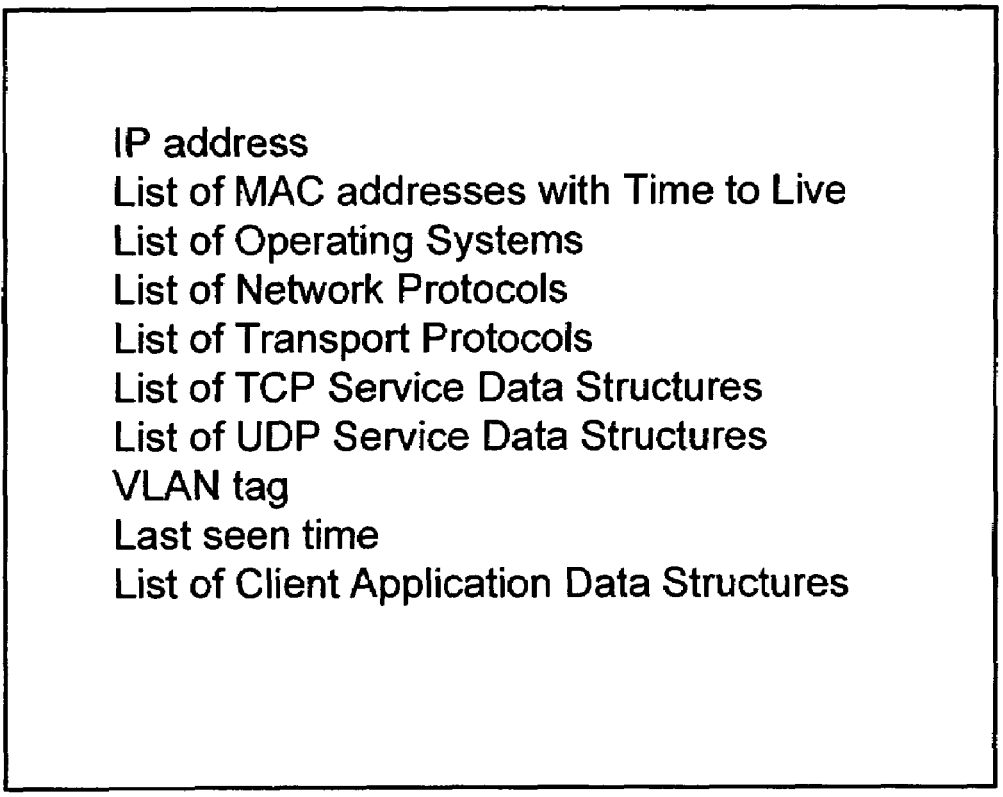
FIG. 2 is an exemplary data structure used to store host information, in accordance with one embodiment.

FIG. 2 is an exemplary data structure used to store network device information, or host information, in accordance with one embodiment. This data structure is the host representative data structure. In one embodiment, host information includes the initiator Internet protocol (IP) address, a list of media access control (MAC) addresses with a time-to-live (TTL) parameter for MAC addresses, a list of operating systems, a list of network protocols, a list of transport protocols, a list of transmission control protocol (TCP) service data structures, a list of user datagram protocol (UDP) service data structures, a list of client application data structures, a virtual local area network (VLAN) tag, and a last seen time. The IP address, MAC address and TTL parameter of at least one network device on the network are typically included in packets transmitted on the network. As a result, these pieces of host information are obtained by directly parsing the network and transport protocol fields of packets.

For example, FIG. 3 shows portions of two exemplary packets that can be decoded, in accordance with one embodiment. The initiator IP address and TTL parameter are obtained directly from the IP section. The MAC address (not shown) can be obtained directly by parsing another section of the packet. As shown in the first exemplary packet, the initiator IP address is 10.1.1.51, and the TTL parameter is 64. As shown in the second exemplary packet, the initiator IP address is 10.1.1.4, and the TTL parameter is 64.

In another embodiment, host information can be used to detect changes that have occurred in the network. For example, by comparing IP addresses and MAC addresses over time, it can be determined if IP addresses have been reassigned.

In another embodiment, host information can also be used to detect and respond to network attacks. For example, the TTL portion of the host identification information corresponds to the number of routing points between the computer generating the packet and the system detecting the packet to extract the host identification information. Some insertion attacks rely on the IDS not knowing its logical location (i.e., the number of routing points between the IDS and the target machine) with respect to a target machine. Thus, an IDS can analyze the TTL portion of the host information and provide an attack alarm if the TTL portion is outside a predefined bound.

After identifying hosts on the network, one embodiment identifies services and/or client applications running on one or more hosts. In one embodiment, the services being run on servers are identified using TCP/IP ports. Clients generally use random ports to connect to servers, but servers generally connect to clients through fixed ports. Most services use specific or default ports. By examining traffic between clients and specific server ports, the type of service can be deduced. For example, traffic to and from a server port 80 suggests the server is a web server. The packets of this traffic can then be parsed to determine the exact type of web server. Client application detection can be implemented by comparing traffic with known protocols and validating the fields of the protocol. Having identified the host in the previous step, services and/or client applications found for hosts can be added to a list of services and/or client applications data structure attached to the host representative data structure of the host, as shown in FIG. 2.

Because some embodiments continuously examine network traffic, a third function for recording any changes occurring on the network in real-time can be included. As described above, some embodiments can immediately update changes that have occurred to fields parsed directly from a packet. This information includes but is not limited to the IP address, MAC address and TTL parameter of the server. Update information can also be obtained through other means in real-time. For example, such information includes the operating system and the client applications running on a particular host. This function is particularly advantageous over manual and active automatic methods.

Some embodiments can additionally allow information to be gathered in a format that can be used to enhance intrusion detection systems or to provide continuous real-time reports of the status of the network. The host representative data structure may be used as input to an IDS. If an IDS knows the operating system and client applications running on a host targeted by an attack, it can be determined whether or not the attack will be harmful. In this way, false positives can be reduced significantly. The host representative data may also be used to provide continuous real-time reports of the status of the network in an NMS. Such reports may be useful to system administrators.

Figure 4:
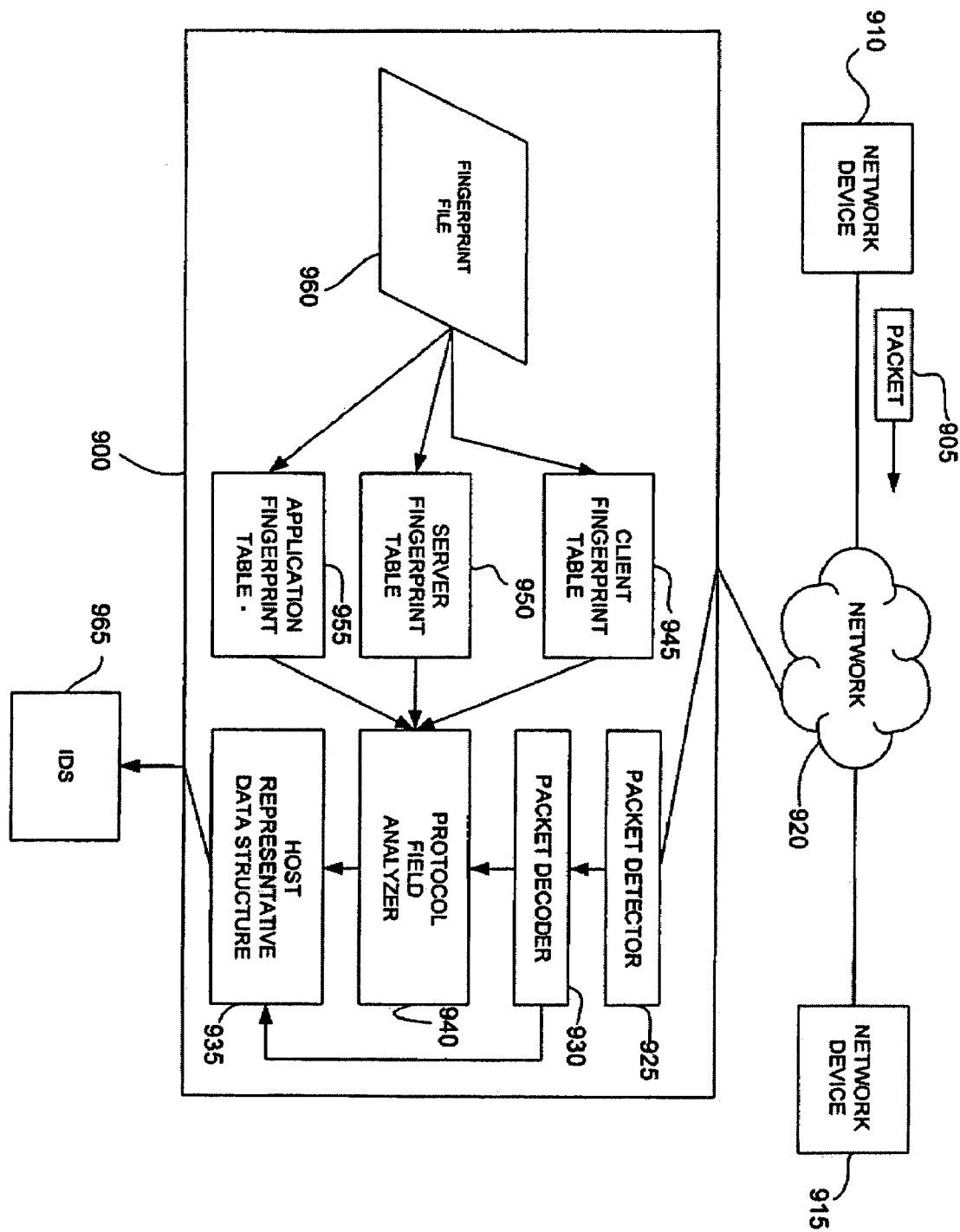
FIG. 4 is a schematic diagram illustrating a system for characterizing a network, in accordance with one embodiment.

FIG. 4 is a schematic diagram illustrating a system for characterizing a network, in accordance with one embodiment. In FIG. 4, a packet 905 is transmitted from network device 910 to network device 915 on network 920. Network 920 can include but is not limited to a local area network (LAN), wide area network (WAN), an intranet, an internet or the Internet. Network detection system 900 is coupled to network 920.

Network detection system 900 includes packet detector 925 to detect and read packet 905. A packet decoder 930 decodes packet 905 into protocol fields and records selected protocol fields in host representative data structure 935, as described above. For example, IP and MAC TCP fields are decoded from packet 905. Protocol field analyzer 940 identifies network device 910 using the protocol fields of packet 905. In another embodiment of this system, protocol analyzer 940 identifies the logical location of network device 910 on network 920 using the protocol fields of packet 905.

In another embodiment of this system, protocol analyzer 940 identifies the operating system of network device 910 using the protocol fields of packet 905. Protocol analyzer 940 compares protocol fields to a fingerprint table that contains lists of protocol field values for particular operating systems. In another embodiment of this system, packet decoder 930 decodes packet 905 into network protocol fields and application protocol fields. Protocol analyzer 940 further analyzes the network protocol fields to determine if packet 905 originated from a client or server. If packet 905 contains network protocol fields identifying network device 910 as a client, then protocol analyzer 940 selects client fingerprint table 945 for comparison with the network protocol fields. If packet 905 contains network protocol fields identifying network device 910 as a server, then protocol analyzer 940 selects server fingerprint table 950 for comparison with the network protocol fields. If packet 905 contains application protocol fields, then protocol analyzer 940 selects application fingerprint table 955 for comparison with the application protocol fields. Protocol analyzer 940 selects one or more fingerprint tables for analysis. Fingerprint tables are loaded into system 900 from fingerprint file 960 or a fingerprint table database. Fingerprint file 960 is stored in memory. The memory is internal or external to system 900. Matching operating systems are recorded in host representative data structure 935.

In another embodiment of this system, protocol analyzer 940 identifies the client applications running on network device 910 using the protocol fields decoded from packet 905.

In another embodiment, protocol analyzer 940 reports the information stored in host representative data structure 935 to IDS 965 or an NMS. IDS 965 uses information from host representative data structure 935 to more effectively protect the network. For example, IDS 965 uses information about the network devices 910 and 915 to detect and prevent evasion attacks. In addition, IDS 965 uses information about network devices 910 and 915 to determine whether an attack is harmful, and only report those attacks that are harmful.

For packets on network 920 that are detected and decoded, a host representative data structure is created. In some embodiments, all host representative data is maintained. In other embodiments, host representative data is maintained only if it provides new information or updates a existing host representative data. Host representative data can be stored in a host representative database or network device database. In another embodiment, host representative data is maintained for a user configurable period of time. A last seen time field in the host representative data structure is set when the host representative data structure is created and when it is updated.

Client Applications Identification

In another embodiment, a client application on a host can be identified from its data. Client applications can connect from random ports and, for this reason, a client application can be validated based on its data instead of or in addition to its port.

Client application identification is implemented by overlaying the protocol of a client application on the given packet stream and validating the fields and flow of the protocol. The protocol validation is verified using one client packet or many client and server packets depending on the protocol.

Figure 5:
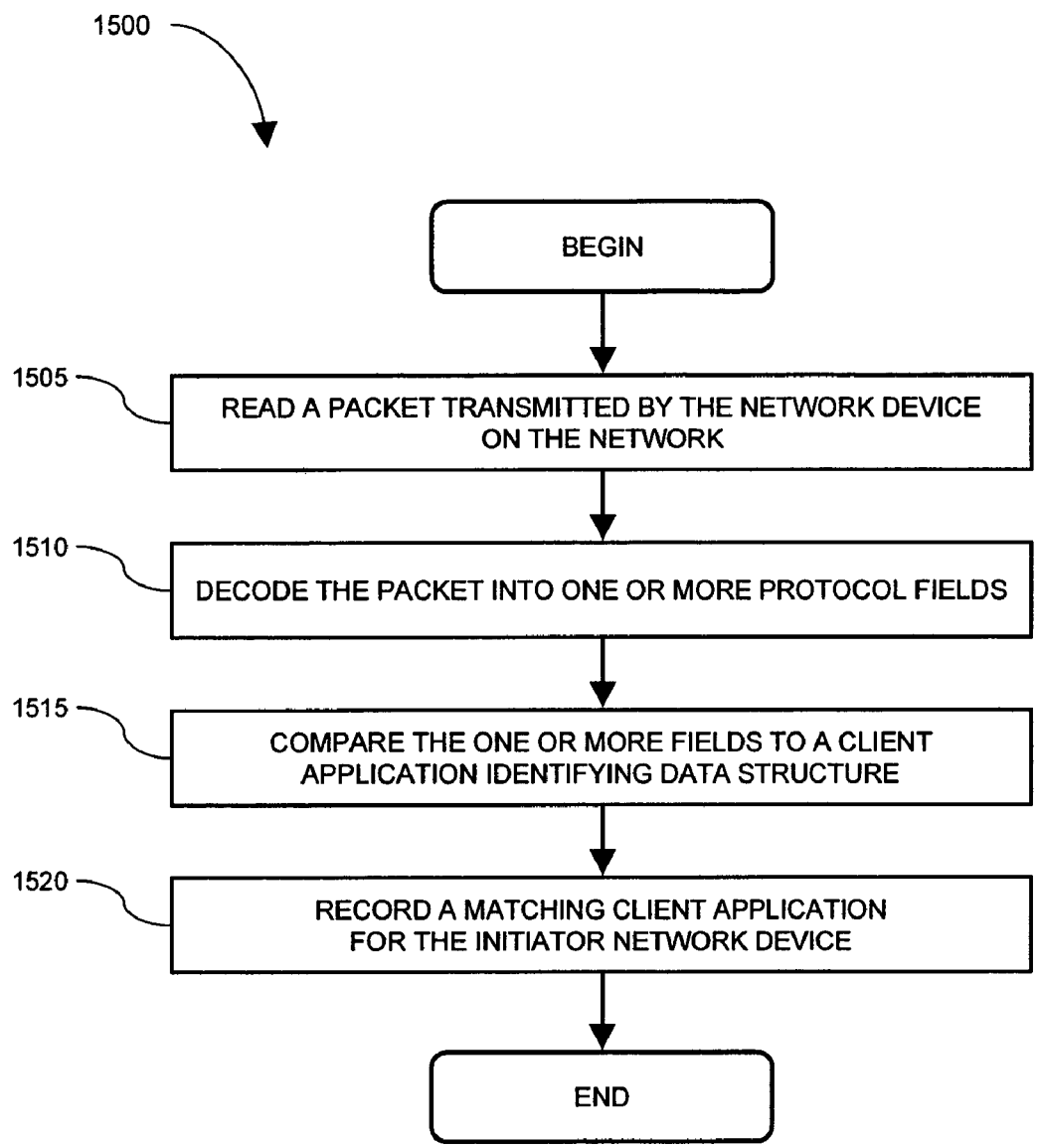
FIG. 5 is a flowchart showing a method for identifying a client application running on a network device from a packet, in accordance with one embodiment.

FIG. 5 is a flowchart showing a method 1500 for identifying a client application running on a network device from a packet.

In step 1505 of method 1500, a packet transmitted by the network device on the network is read.

In step 1510, the packet is decoded into one or more protocol fields.

In step 1515, the one or more fields are compared to a client application identifying data structure. A client application identifying data structure contains predefined protocol fields that identify a client application.

In step 1520, a matched client application is recorded as the client application running on the network device.

In some embodiments, a client application can be identified directly from a single packet. In one example, an HTTP web browser can be detected. HTTP web browsers and other clients transmit packets using a documented structure. For example, the following packet structure can be validated to verify a client application as an HTTP browser:

<Command> <URL> HTTP/<version><Line terminator>
<arbitrary data><Line terminator>
. . .
User-Agent: Mozilla/<arbitrary data> (<arbitrary data> compatible;<arbitrary data>
MSIE/<browser version>;)<Line terminator>
. . .
<arbitrary line><Line terminator>

In the above example, <Command> can be any one of the following: GET, PUT, POST, HEAD, TRACE, DELETE, OPTIONS, <URL> can be a destination website, <version> can be the HTTP version such as 0.9, 1.0, or 1.1, <Line terminator> can be CRLF or LF, <arbitrary data> can be an arbitrary text string, and <browser version> can be the version of the client application.

Client application data can be attached to the host data structure for the corresponding host. As non-limiting examples, data including client application type, client application product, and client application version can be stored in the host data structure.

Figure 6:
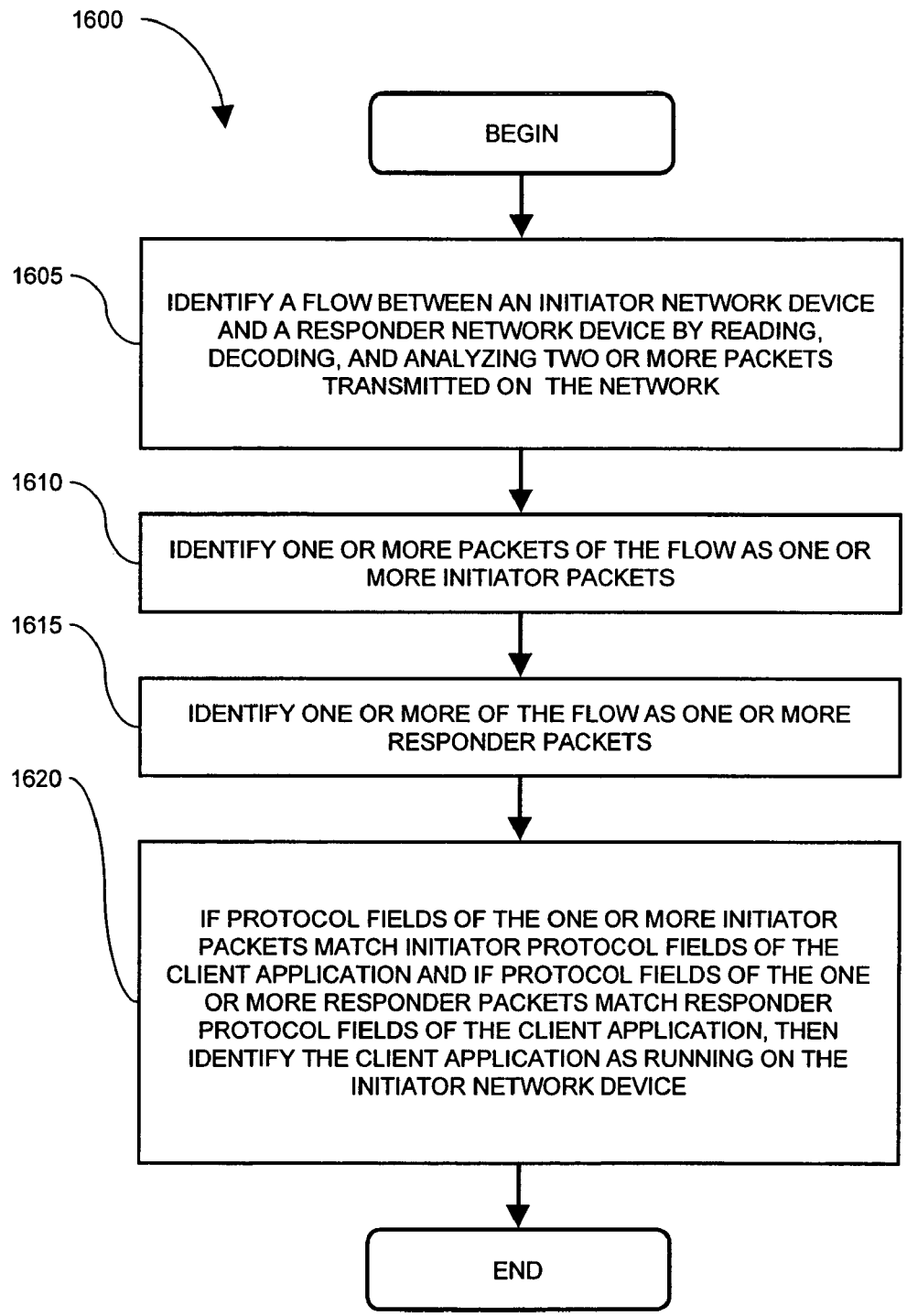
FIG. 6 is a flowchart showing a method for identifying a client application running on a network device from two or more packets, in accordance with one embodiment.

FIG. 6 is a flowchart showing a method 1600 for identifying a client application running on a network device from two or more packets, in accordance with one embodiment.

In step 1605 of method 1600, a flow between an initiator network device and a responder network device is identified by reading, decoding, and analyzing two or more packets transmitted on the network.

In step 1610, one or more packets of the flow are identified as one or more initiator packets.

In step 1615, one or more packets of the flow are identified as one or more responder packets.

In step 1620, if protocol fields of the one or more initiator packets match initiator protocol fields of the client application and if protocol fields of the one or more responder packets match responder protocol fields of the client application, then the client application is identified as running on the initiator network device.

Figure 7:
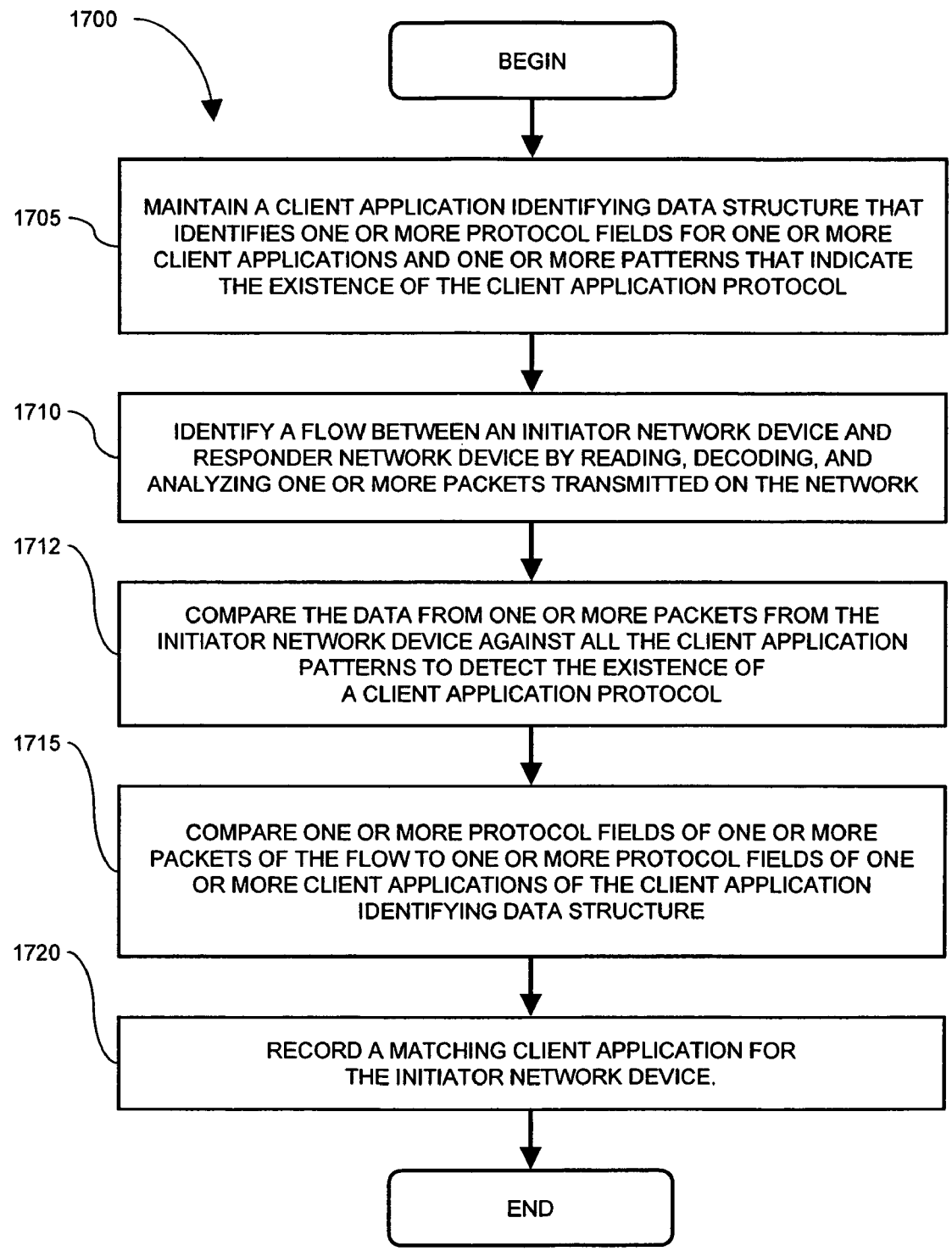
FIG. 7 is a flowchart showing a method for identifying a client application running on a network device by comparing protocol fields of one or more packets from a flow to a client application identifying data structure, in accordance with one embodiment.

FIG. 7 is a flowchart showing a method 1700 for identifying a client application running on a network device by comparing protocol fields of one or more packets from a flow to a client application identifying data structure, in accordance with one embodiment.

In step 1705 of method 1700, a client application identifying data structure is maintained that identifies one or more protocol fields for one or more client applications and one or more patterns for indicating the existence of a client application protocol.

In step 1710, a flow between an initiator network device and responder network device is identified by reading, decoding, and analyzing two or more packets transmitted on the network.

In step 1712, one or more packets from the initiator network device are compared to one or more client application patterns for detecting a client application protocol.

In step 1715, one or more protocol fields of one or more packets of the flow are compared to one or more protocol fields of one or more client applications of the client application identifying data structure. In one embodiment the client application identifying data structure identifies protocol fields from packets sent by both the initiator and the responder.

In step 1720, a matching client application is recorded for the initiator network device.

Flow Analysis

A flow is a TCP session or a UDP pseudo session. A TCP session is defined as a complete TCP session beginning with the 3-way TCP handshake, followed by data packets, and terminated with TCP tear-down sequence of finished (FIN) flags and acknowledgement (ACK) flags to the FINS. The UDP protocol is a connectionless protocol, which means that there is no connection or tear-down sequence. However, most applications that use UDP pass packets in both directions. In UDP pseudo sessions, the first packet from the client is used to create the session and packets passed with the same IP addresses and ports are included as part of the session. The UDP session remains active until no session packets are detected for a timeout period.

Flow can be monitored and statistics about the flow compiled and stored when the flow is terminated. Information available from a flow includes an IP address of the session initiator, an IP address of the session responder, a port of the session initiator, a port of the session responder, a time of the first packet, a time of the last packet, the number of packets sent by the session initiator, the number of packets sent by the session responder, the number of bytes sent by the session initiator, the number of bytes sent by the session responder, the service utilized during the session, and the client application that initiated the session.

From this information it is determined what client applications a client typically uses, which servers a client typically utilizes, how much data a client typically transfers, how much data a server typically serves, how many connections per second a server handles, the server load during different time periods, how much traffic a client generates during different time periods, which servers clients connect to, which clients connect to a server, and what is the typical conversation size between a client and a server.

In one embodiment, flow analysis is used to identify hosts, host operating systems, and host client applications. In an exemplary method of flow analysis, packets entering the flow analyzer are first classified according to the version of the IP protocol. If a packet is IP version 4, the packet is checked to see if it belongs to an existing flow. If a new flow is detected, a flow key is created consisting of the source and destination IP addresses, source and destination ports, and the IP protocol. The new flow is entered into a hash table.

The hash table has a use list and a free list and is different from a standard hash table in that a memory cap is used. Once the memory cap is hit, the hash table will discard flows. The oldest flows are discarded first. A call back function is supplied to allow a flow to be marked for deletion. The hash table performs necessary memory management.

When a new flow is detected, the packet type determines the flow type (TCP, UDP, IP fragment, etc.). The flow type is used to determine the analysis that is to be performed. For example, if a flow is discovered and the flow type is identified as TCP hosts identification, host operating system identification, and host client application identification is performed.

Figure 8:
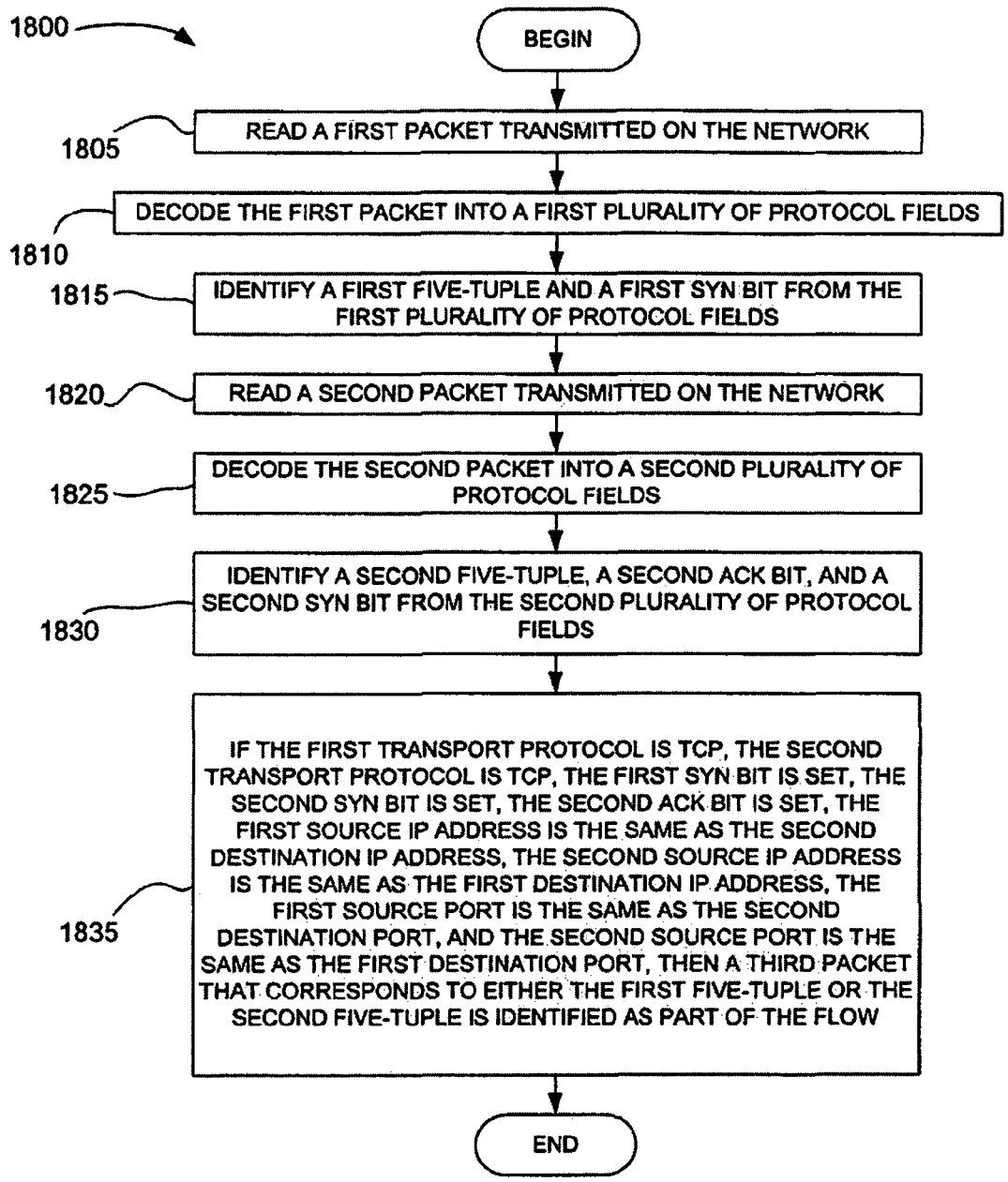
FIG. 8 is a flowchart showing a method for identifying transmission control protocol flow on a network, in accordance with one embodiment.

FIG. 8 is a flowchart showing a method 1800 for identifying TCP flow on a network, in accordance with one embodiment.

In step 1805 of method 1800, a first packet transmitted on the network is read.

In step 1810, the first packet is decoded into a first plurality of protocol fields.

In step 1815, a first five-tuple and a first SYN bit are identified from the first plurality of protocol fields. A first source IP address, a first destination IP address, a first transport protocol, a first source port, and a first destination port make up the first five-tuple.

In step 1820, a second packet transmitted on the network is read.

In step 1825, the second packet is decoded into a second plurality of protocol fields.

In step 1830, a second five-tuple, a second ACK bit, and a second SYN bit are identified from the second plurality of protocol fields. A second source IP address, a second destination IP address, a second transport protocol, a second source port, and a second destination make up the second five-tuple.

In step 1835, if the first transport protocol is TCP, the second transport protocol is TCP, the first SYN bit is set, the second SYN bit is set, the second ACK bit is set, the first source IP address is the same as the second destination IP address, the second source IP address is the same as the first destination IP address, the first source port is the same as the second destination port, and the second source port is the same as the first destination port, then a third packet that corresponds to either the first five-tuple or the second five-tuple is identified as part of the flow.

In another embodiment of this method, the flow is a session. In another embodiment of this method, the initiator of the first packet is called a client or session initiator. The initiator of the second packet is called a server or session responder.

In another embodiment of this method, the first five-tuple and the second five tuple are recorded. In another embodiment of this method, a plurality of packets are identified that correspond to the first five-tuple or the second five-tuple.

In another embodiment of this method, the flow is terminated by a FIN bit sent by the session initiator, followed by an ACK bit sent by the session responder, followed by a FIN bit sent by the session responder, and followed by an ACK bit sent by the session initiator.

Figure 9:
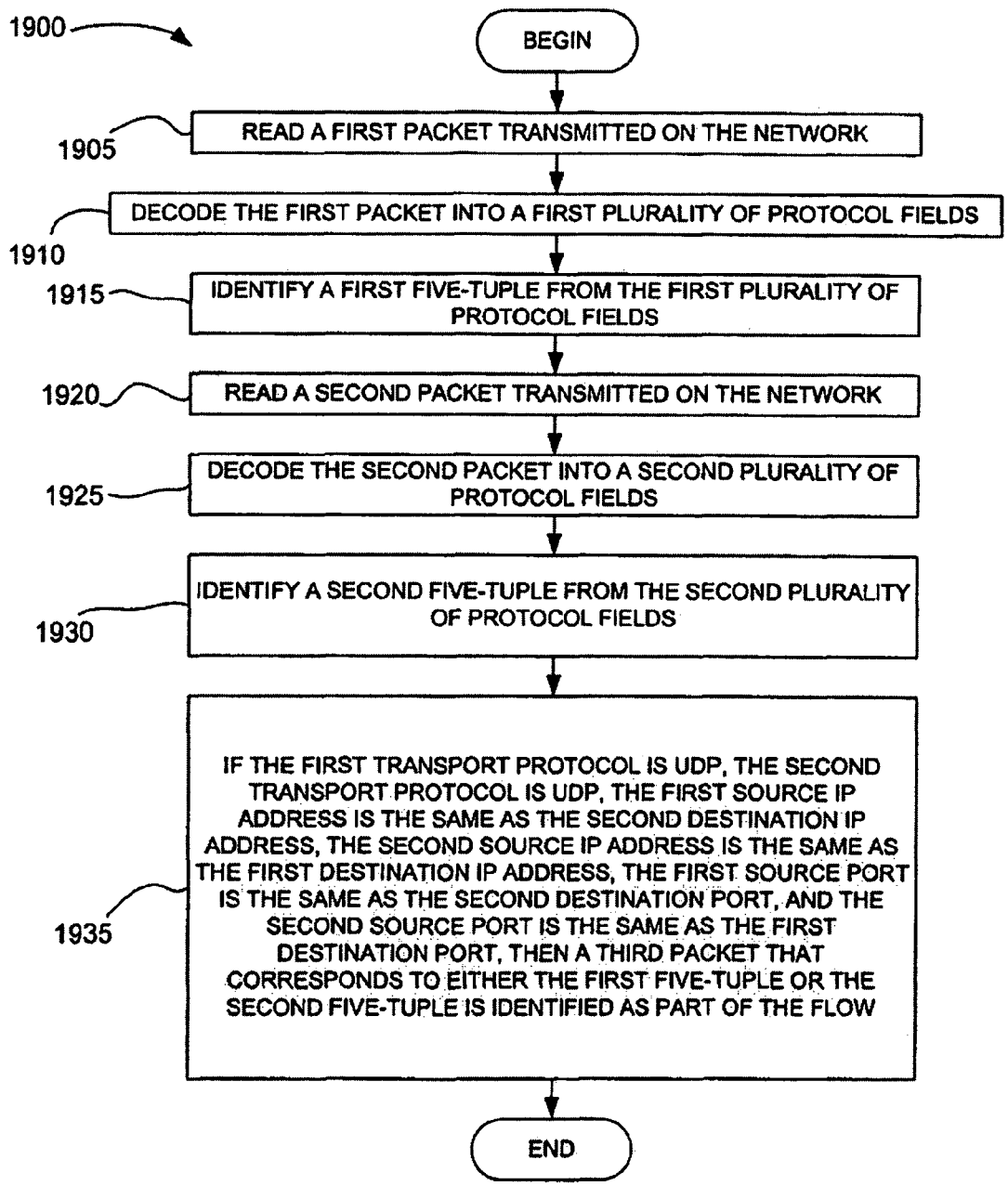
FIG. 9 is a flowchart showing a method for identifying user datagram protocol flow on a network, in accordance with one embodiment.

FIG. 9 is a flowchart showing a method 1900 for identifying UDP flow on a network, in accordance with one embodiment.

In step 1905 of method 1900, a first packet transmitted on the network is read.

In step 1910, the first packet is decoded into a first plurality of protocol fields.

In step 1915, a first five-tuple is identified from the first plurality of protocol fields. A first source IP address, a first destination IP address, a first transport protocol, a first source port, and a first destination port make up the first five-tuple.

In step 1920, a second packet transmitted on the network is read.

In step 1925, the second packet is decoded into a second plurality of protocol fields.

In step 1930, a second five-tuple is identified from the second plurality of protocol fields. A second source IP address, a second destination IP address, a second transport protocol, a second source port, and a second destination make up the second five-tuple.

In step 1935, if the first transport protocol is UDP, the second transport protocol is UDP, the first source IP address is the same as the second destination IP address, the second source IP address is the same as the first destination IP address, the first source port is the same as the second destination port, and the second source port is the same as the first destination port, then a third packet that corresponds to either the first five-tuple or the second five-tuple is identified as part of the flow.

In another embodiment of this method, the flow is a session. In another embodiment of this method, the initiator of the first packet is called a client or session initiator. The initiator of the second packet is called a server or session responder.

In another embodiment of this method, the first five-tuple and the second five-tuple are recorded. In another embodiment of this method, a plurality of packets are identified that correspond to the first five-tuple or the second five-tuple.

Confidence Assessment

Another embodiment includes a method for selecting a client application running on a host from the results of two or more techniques of client application identification. In this method, the two or more techniques of client application identification can be used to identify a client application running on the host and produce a result. Results are assigned a confidence value, or weight, based on the technique used to produce it. Two or more results are compared, and the result with the highest confidence value is selected as the client application running on the host.

Figure 10:
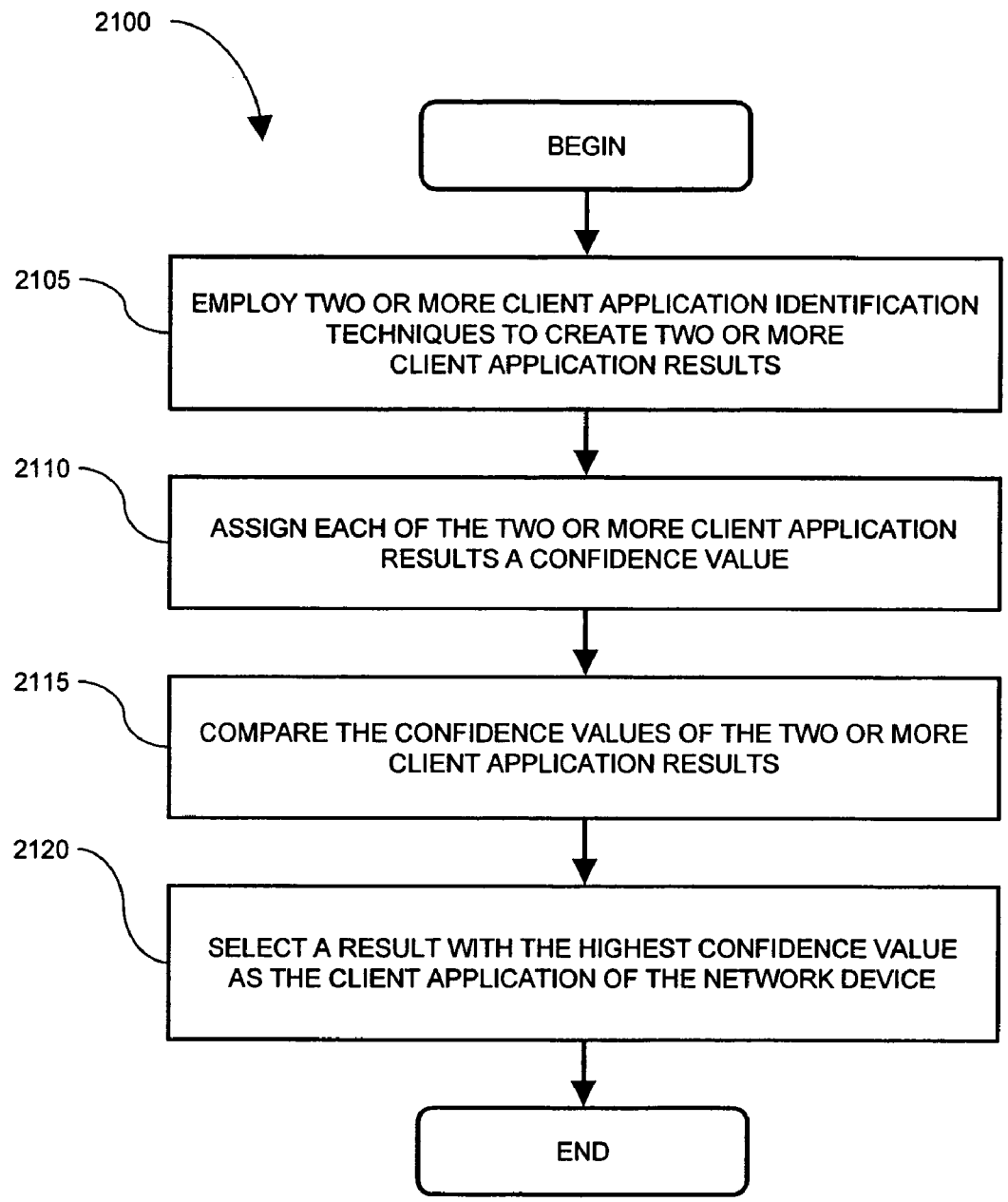
FIG. 10 is a flowchart showing a method for selecting a client application of a network device from the results of two or more client application identification techniques used in a passive network detection system, in accordance with one embodiment.

FIG. 10 is a flowchart showing a method 2100 for selecting a client application of a network device from the results of two or more client application identification techniques used in a passive network detection system, in accordance with one embodiment.

In step 2105 of method 2100, two or more client application identification techniques are employed to create two or more client application results.

In step 2110, two or more client application results are assigned a confidence value.

In step 2115, the confidence values of the two or more client application results are compared.

In step 2120, the result with a highest confidence value is selected as the client application of the network device.

In another embodiment, the confidence value of an operating system result or client application result is determined by considering if subsequent results match that result. An initial confidence value is assigned as the confidence value of a result. The previous confidence value of the result is initially set to zero. One half of the absolute value of the difference between the confidence value and the previous confidence value is added to the confidence value for successive matches. This is the confirming increment value. For example, if a result is initially assigned a confidence value of 50, four successive matches have confidence values of 75, 87, 93, and 96, respectively.

Non-match or different matches subtract from the confidence value. The amount subtracted for non-matches is the detracting increment value. The detracting increment value is one half of the confirming increment value. For example, if confidence is 75 with a confirm value of 12 and the next point does not match, the confidence value is 69. On successive non-matches the detracting increment value is doubled. If the detraction points come from the same IP address, the detracting increment value is reduced by a factor of 4.

Figure 11:
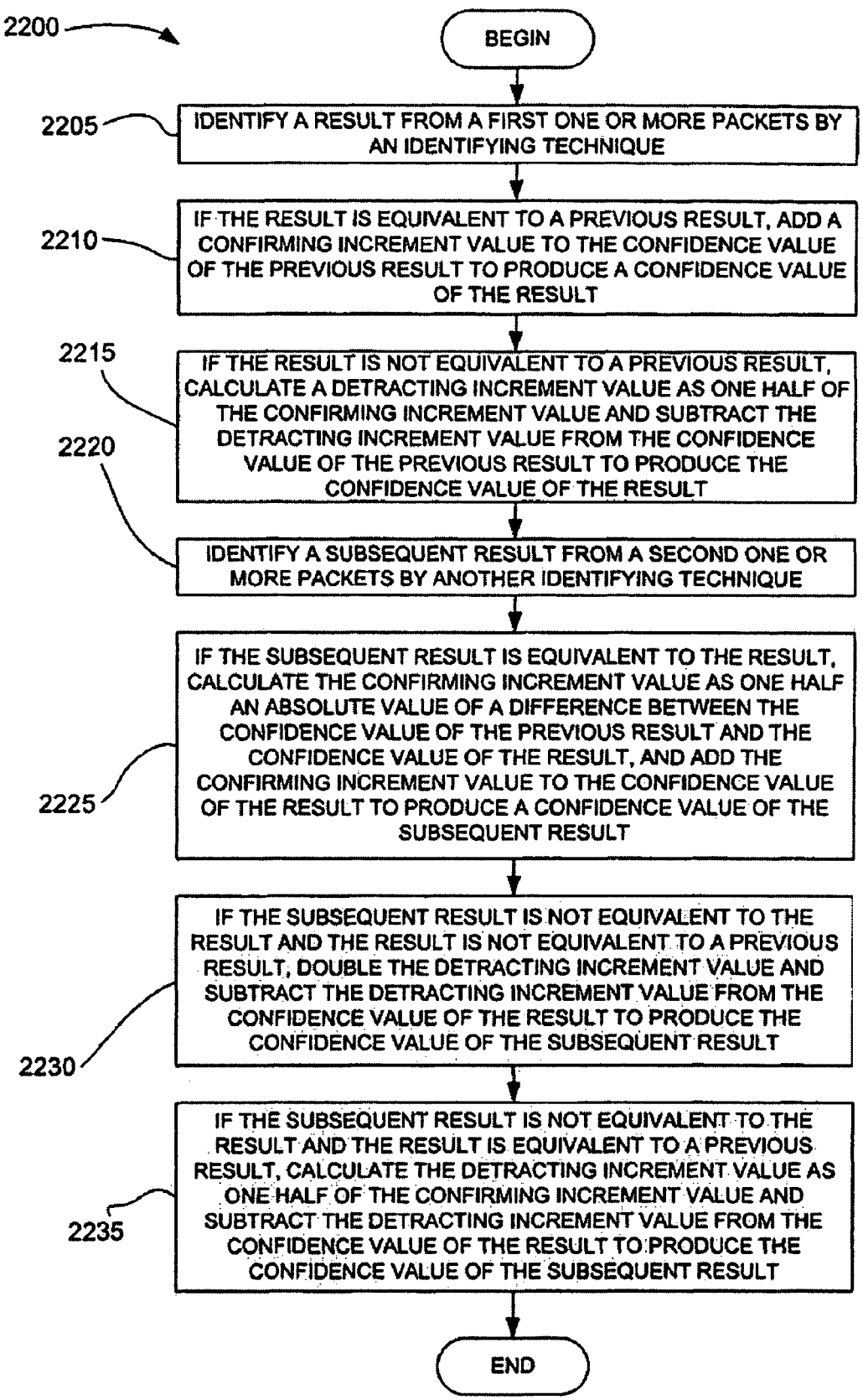
FIG. 11 is a flowchart showing a method for determining the confidence value of a result of an operating system or a client application by considering previous results obtained by more than one identification technique used in a passive network detection system, in accordance with one embodiment.

FIG. 11 is a flowchart showing a method 2200 for determining the confidence value of a result of an operating system or a client application by considering previous results obtained by more than one identification technique used in a passive network detection system, in accordance with one embodiment.

In step 2205 of method 2200, a result is identified from a first one or more packets by an identifying technique.

In step 2210, if the result is equivalent to a previous result, a confirming increment value is added to the confidence value of the previous result to produce a confidence value of the result. The confirming increment value is calculated as one half the absolute value of the difference between the confidence value of the previous result and the confidence value of the result.

In step 2215, if the result is not equivalent to a previous result, a detracting increment value is calculated as one half of the confirming increment value and the detracting increment value is subtracted from the confidence value of the previous result to produce the confidence value of the result.

In step 2220, a subsequent result is identified from a second one or more packets by another identifying technique.

In step 2225, if the subsequent result is equivalent to the result, the confirming increment value is calculated as one half an absolute value of a difference between the confidence value of the previous result and the confidence value of the result, and the confirming increment value is added to the confidence value of the result to produce a confidence value of the subsequent result.

In step 2230, if the subsequent result is not equivalent to the result and the result is not equivalent to a previous result, the detracting increment value is doubled and the detracting increment value is subtracted from the confidence value of the result to produce the confidence value of the subsequent result.

In step 2235, if the subsequent result is not equivalent to the result and the result is equivalent to a previous result, the detracting increment value is calculated as one half of the confirming increment value and the detracting increment value is subtracted from the confidence value of the result to produce the confidence value of the subsequent result.

For operating system fingerprinting methods, the maximum confidence value is scaled by the number of hops from the location at which packets are detected. The maximum confidence value is the difference between one hundred and twice the number of hops. The minimum maximum confidence value is fifty. The confirming increment value is also scaled by the number of hops from the location at which packets are detected. The confirming increment value is divided by one half the number of hops. The detracting increment value is not dependent on the number of hops from the location at which packets are detected. The minimum confirming increment value and the minimum detracting increment value is one.

Vulnerability Analysis

In another embodiment, vulnerabilities are assigned to hosts discovered on a network. Vulnerabilities are known methods of maliciously gaining access to a host or host client application, or maliciously attacking a host or host client application. The vulnerabilities assigned to a host are derived from various sources. IDSs for example, maintain vulnerability lists.

A list of potential vulnerabilities is stored in a vulnerabilities database (VDB). When a host or host client application is identified, one or more vulnerabilities from the VDB is mapped in real-time to the host or host client application. These vulnerabilities are then displayed in a graphical user interface, linked to the particular host or client application. An administrator, uses this information to patch specific systems or groups of systems.

Vulnerabilities can be mapped using a normalized VDB. This database lists known vulnerabilities, mapping vulnerabilities to the appropriate host operating system or client application. In some embodiments, operating system and client application fingerprints can be first normalized to values stored in the VDB.

Vulnerability lookups are performed real-time. As the information about a host is gathered and the host profile for the system is updated, the vulnerability lookup is also refined to take into account any new or changed data. An exemplary VDB contains a list of vulnerabilities pulled from an IDS. In order for lookups to be performed into this database, the data can be first normalized. This means that products and vendors referenced in a vulnerability are listed in the database once, and vulnerabilities that reference this product or vendor point to the same record. Dependencies are also listed. If a vulnerability occurs for a specific application but only for a specific operating system, this relationship is itemized.

When operating system fingerprints are derived, they are mapped against the normalized operating system information in the VDB. If a fingerprint matches multiple possible operating systems, multiple mappings are created. When an operating system on a particular host is identified, a vulnerability lookup is performed to map to this host the vulnerabilities for this operating system.

In another embodiment, operating system fingerprints are configurable. A utility is provided which allows users to select an operating system fingerprint definition from a host on their network. This tool prompts the user to select appropriate operating system mappings from the VDB. This tools allows users to customize the fingerprints and tailor the vulnerability lookups for the specific host types on their networks.

As with operating system fingerprints, client application fingerprints are also mapped against the normalized product information in the VDB. The client application type, name, vendor, and version are derived from the protocol. A dynamic mapping is created, based on a client application type, a regular expression string matching of the product name, a vendor name, and a version, to products in the VDB. Once the client application is mapped, a vulnerability lookup is performed. Any operating system or other client application dependencies are handled at this time, such that only vulnerabilities that match criteria are mapped.

In another embodiment, a discovered host is actively scanned using vulnerabilities assigned from the VDB. In this way, the list of vulnerabilities for that host is refined from a list of possible vulnerabilities to a smaller set of core vulnerabilities that an administrator must worry about. This elimination of vulnerabilities along with the lowering of the priority of vulnerabilities that have either already been patched on the target system or vulnerabilities that are not currently present due to the configuration of the client application, allows the administrator to target efforts to resolve these vulnerabilities to the most critical problem areas.

Figure 12:
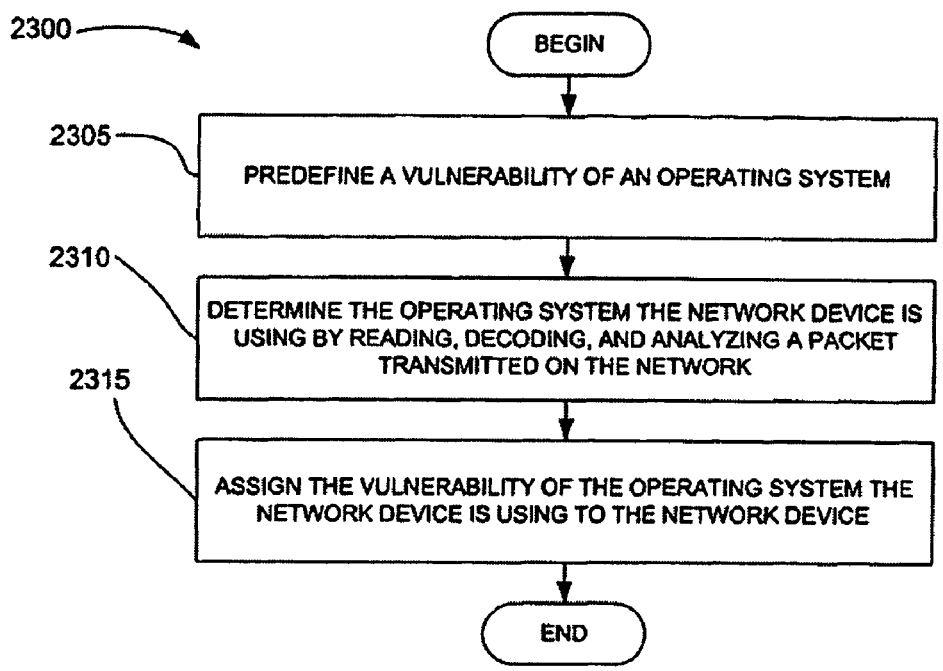
FIG. 12 is a flowchart showing a method for assigning a vulnerability to a network device on a network based on the operating system the network device is using, in accordance with one embodiment.

FIG. 12 is a flowchart showing a method 2300 for assigning a vulnerability to a network device on a network based on the operating system the network device is using, in accordance with one embodiment.

In step 2305 of method 2300, a vulnerability of an operating system is predefined.

In step 2310, the operating system the network device is using is determined by reading, decoding, and analyzing a packet transmitted on the network.

In step 2315, the vulnerability of the operating system the network device is using is assigned to the network device.

Figure 13:
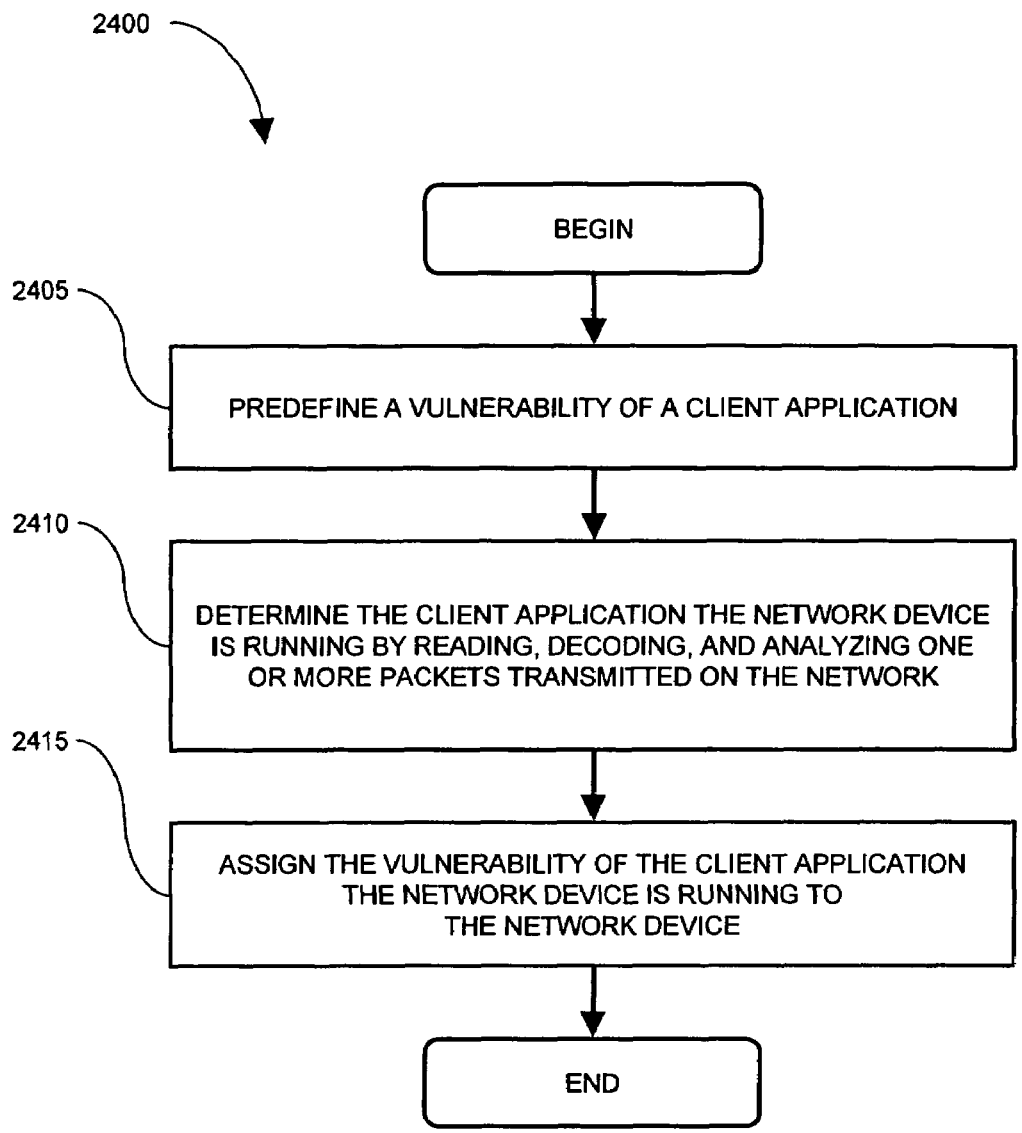
FIG. 13 is a flowchart showing a method for assigning a vulnerability to a network device on a network based on the client application the network device is running, in accordance with one embodiment.

FIG. 13 is a flowchart showing a method 2400 for assigning a vulnerability to a network device on a network based on the client application the network device is running, in accordance with one embodiment.

In step 2405 of method 2400, a vulnerability of a client application is predefined.

In step 2410, the client application the network device is running is determined by reading, decoding, and analyzing a packet transmitted on the network.

In step 2415, the vulnerability of the client application the network device is running is assigned to the network device.

Figure 14:
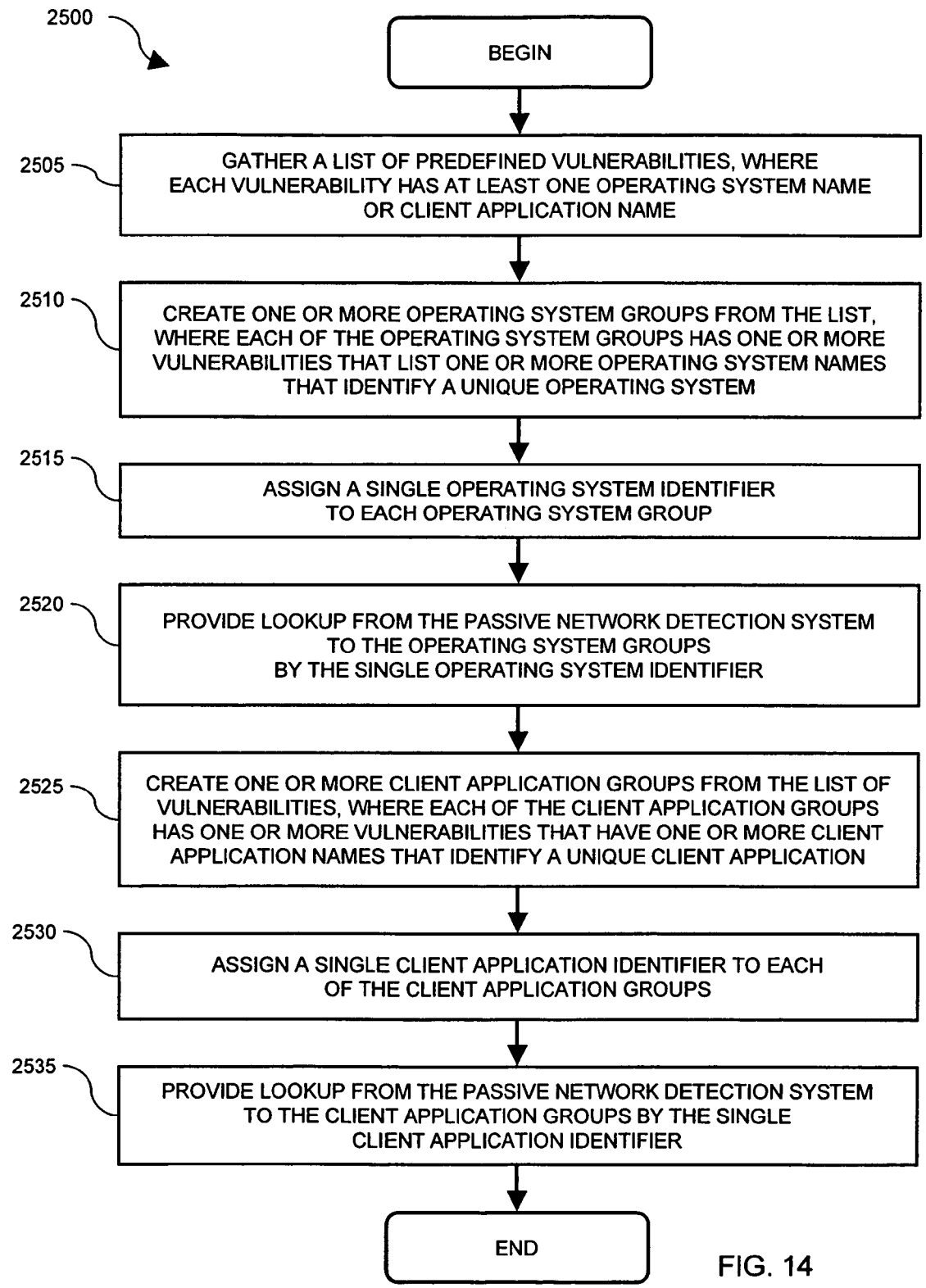
FIG. 14 is a flowchart showing a method for creating a normalized vulnerabilities database for use in a passive network detection system, in accordance with one embodiment.

FIG. 14 is a flowchart showing a method 2500 for creating a normalized vulnerabilities database for use in a passive network detection system, in accordance with one embodiment.

In step 2505 of method 2500, a list of predefined vulnerabilities is gathered, where vulnerabilities have at least one operating system name or client application name.

In step 2510, one or more operating system groups are created from the list, where the operating system groups have one or more vulnerabilities that list one or more operating system names that identify a unique operating system.

In step 2515, a single operating system identifier is assigned to operating system groups.

In step 2520, lookup is provided from the passive network detection system to the operating system groups by the single operating system identifier.

In step 2525, one or more client application groups are created from the list of vulnerabilities, where the client application groups have one or more vulnerabilities that have one or more client application names that identify a unique client application.

In step 2530, a single client application identifier is assigned to the client application groups.

In step 2535, lookup is provided from the passive network detection system to the client application groups by the single client application identifier.

Policy Analysis and Alerting

In another embodiment, information passively discovered on a network is used to enforce a network configuration and usage policy. An action is performed if a usage policy is violated. Exemplary actions include alerting the user and denying network access based on the type of information discovered or when that information was discovered.

One exemplary usage policy is the prevention of unauthorized operating system usage. An action is triggered if a discovered operating system does not match the allowable operating system for the given IP address. For example, a user specifies that only Windows 2000™ and Windows XP™ may be used on the network. If a host with any other operating system detected, an alert would be generated and the offending host would be blocked at the firewall.

Another exemplary usage policy is the prevention of unauthorized client application usage. An action is triggered if a prohibited client application is detected. For example, the user specifies that client application A is not permitted on subnet X. If client application A is detected on subnet X, an alert is generated.

In another example, a user specifies that for subnet Z, Linux is the only permitted operating system. Additionally, the only permitted client applications are certain web browsers. Any violations of this policy generates an alert.

Another exemplary usage policy is the qualification of events. The criticality of an alert is adjusted based on information gathered from multiple sources. For example, if an attack that only affects IIS is detected and the host is a Windows™ system running IIS, a critical alert is generated. If an attack that only affects IIS is detected and the host is a Linux system, which cannot run IIS, an informational alert is generated.

Another exemplary usage policy is defining a threshold for a single event. An action is triggered upon detecting multiple events of the same type within a given time period. For example, if ten failed login attempts to a single service are detected within a thirty second time period, an alert is generated to indicate a brute force login attempt. In another example, if fifteen failed login attempts followed by a successful login to a single service are detected within a forty-five second time period, an alert is generated to indicate a successful brute force login and the client system is blocked at the firewall.

Another exemplary usage policy is detecting IDS event sequences. An action is triggered upon detecting multiple events in a given sequence within a given time period. For example, the sequence of events E, F, and G destined for a single host is indicative of a successful compromise of a host. Individually, none of the events is considered critical and are ignored. However, when occurring sequentially within a 60 second time period they represent a critical event and generate a critical alert.

In another example, a buffer overflow attack is detected against a host and within 5 minutes a new telnet server is detected on the host. A critical alert is generated and the firewall blocks traffic to and from the host.

Another exemplary usage policy is maintaining temporal constraints. An action is triggered upon detecting sessions established during prohibited times. For example, normal virtual private network (VPN) connections occur between the hours of 7:00 AM and 9:00 PM EST. A connection initiated at 2:00 AM generates an alert.

Another exemplary usage policy is maintaining statistical constraints. An action is triggered upon detecting deviations from normal operating parameters. For example, a web server that normally serves 30000 hits per hour is currently serving 5 hits per hour. An alert is generated.

Additional policy response actions include event logging to a local database, system logging a service message, performing a simple network management protocol (SNMP) trap, generating an e-mail message, controlling a network device (e.g. invoke a firewall rule or disable a network switch port), and raise or lower the priority of an IDS event.

The user configures a policy. The policy consists of a list of rules and groups of rules. Rules and groups of rules can be associated with a set of response actions. Rules can be activated to become part of the active policy. As the nodes on the monitored networks change, events are generated to reflect the changes. If a new client application is detected on a host, an event is generated that contains the new client application information. The events and the data contained within the events are evaluated against the currently active policy. If the event or the data within the event causes the rule to fail, an event is generated that triggers the configured responses. If a node changes to the Windows™ operating system and a policy is written that prohibits the Windows™ operating system is in effect with an e-mail response action configured, an e-mail message is generated containing the event data and rule ID.

Figure 15:
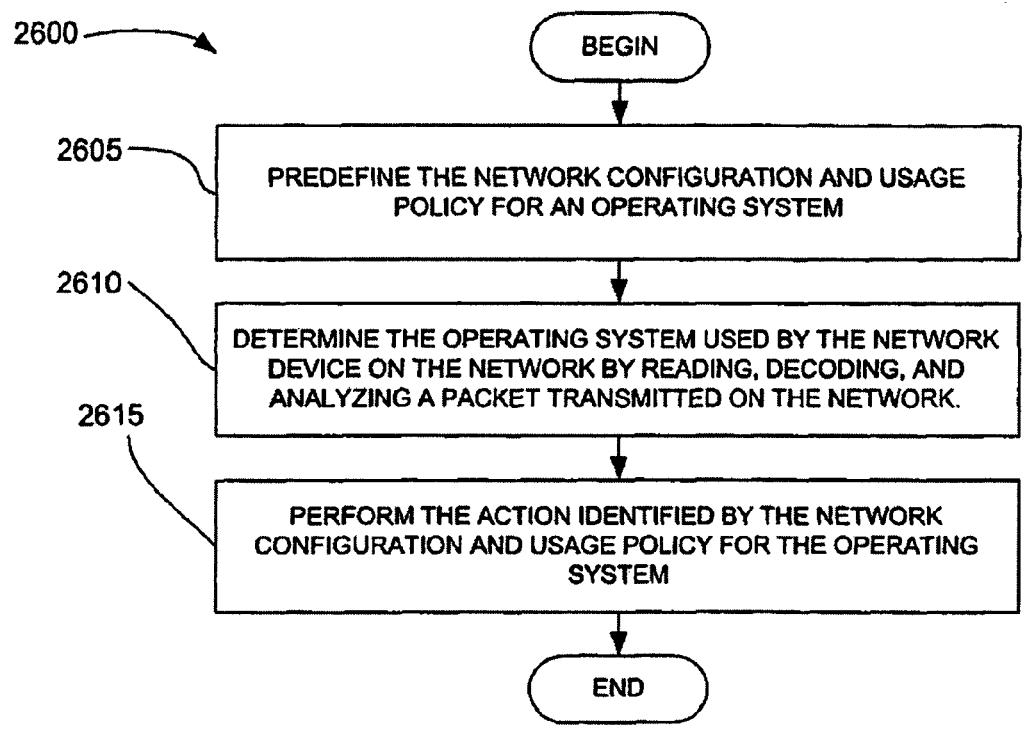
FIG. 15 is a flowchart showing a method for enforcing a network configuration and usage policy based on an operating system using a passive network detection system, in accordance with one embodiment.

FIG. 15 is a flowchart showing a method 2600 for enforcing a network configuration and usage policy based on an operating system using a passive network detection system, in accordance with one embodiment.

In step 2605 of method 2600, the network configuration and usage policy for an operating system is predefined.

In step 2610, the operating system used by the network device on the network is determined by reading, decoding, and analyzing a packet transmitted on the network.

In step 2615, an action identified by the network configuration and usage policy for the operating system is performed.

Figure 16:
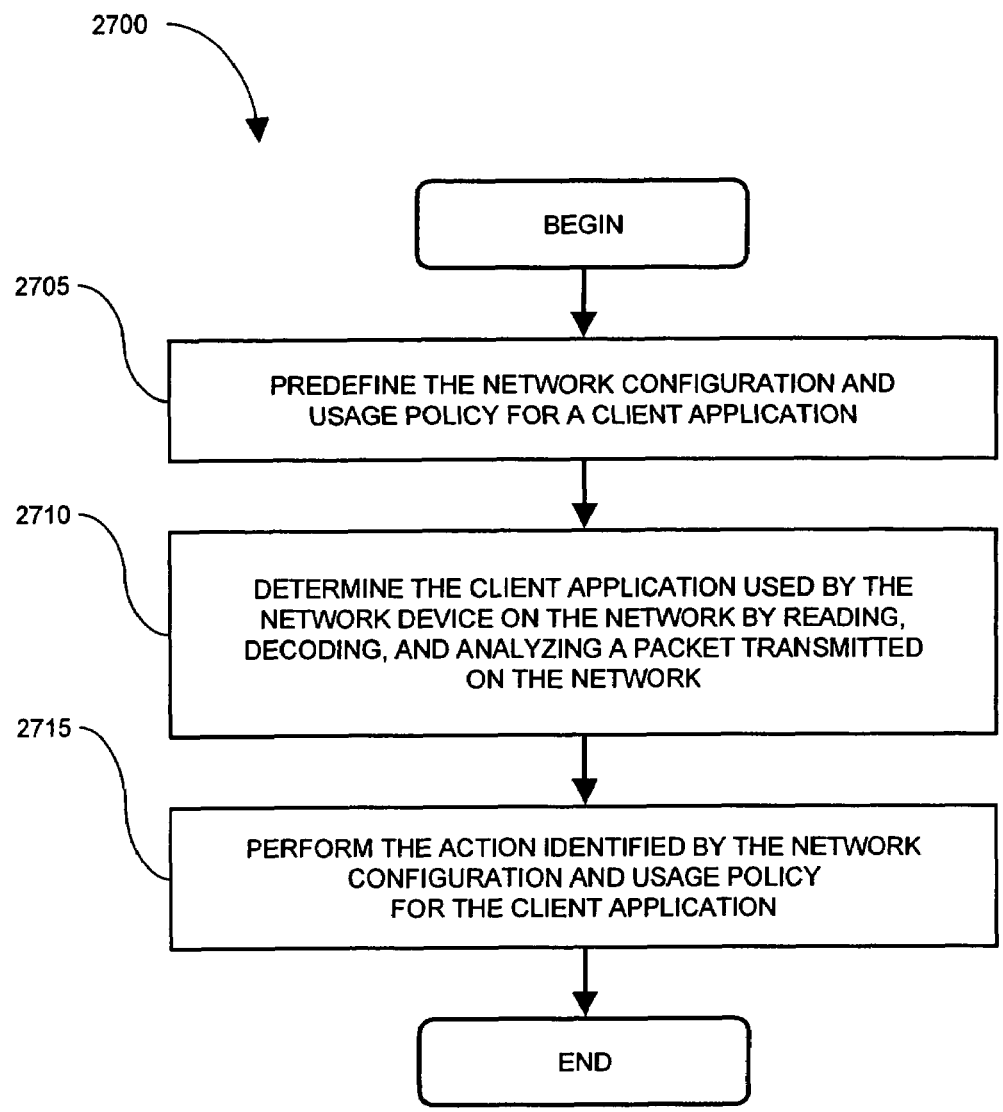
FIG. 16 is a flowchart showing a method for enforcing a network configuration and usage policy based on a client application using a passive network detection system, in accordance with one embodiment.

FIG. 16 is a flowchart showing a method 2700 for enforcing a network configuration and usage policy based on a client application using a passive network detection system, in accordance with one embodiment.

In step 2705 of method 2700, the network configuration and usage policy for a client application is predefined.

In step 2710, the client application used by the network device on the network is determined by reading, decoding, and analyzing a packet transmitted on the network.

In step 2715, an action identified by the network configuration and usage policy for the client application is performed.

Figure 17:
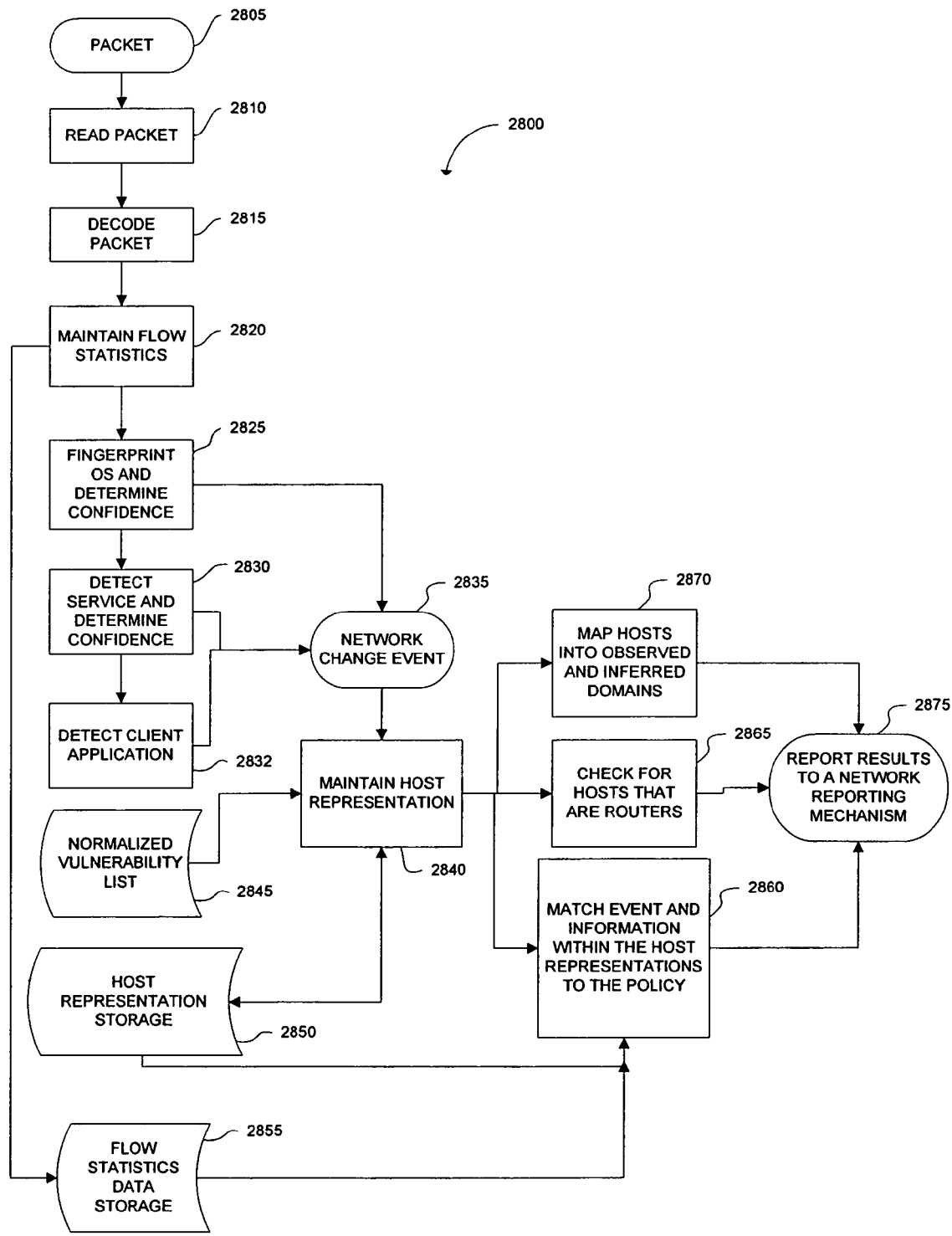
FIG. 17 is a schematic diagram illustrating a passive network detection system, in accordance with one embodiment.

FIG. 17 is a schematic diagram illustrating a passive network detection system, in accordance with one embodiment.

In system 2800, packet 2805 is read by packet reader 2810. Packet decoder 2815 decodes packet 2805. Flow analyzer 2820 identifies a flow from two or more decoded packets. Flow analyzer 2820 also maintains flow statistics. Operating system detector 2825 receives decoded packets from flow analyzer 2820, detects one or more operating systems using one or more identification techniques, and selects an operating system from the one or more operating systems using confidence assessment. Service detector 2830 receives decoded packets from operating system detector 2825, detects an one or more services using one or more identification techniques, and selects a service from the one or more services using confidence assessment. Client application detector 2832 receives decoded packets from service detector 2830, detects an one or more client applications using one or more identification techniques, and selects a client application from the one or more client applications using confidence assessment.

Network change monitor 2835 monitors network device operating system, client application and service changes. Host representation monitor 2840 monitors changes to operating systems, client applications, and services detected on the network. Normalized vulnerability list 2845 groups vulnerabilities by operating system, client application, and service and provides vulnerabilities to host representation monitor. Host representation storage 2850 stores operating system, client application, and service information that is detected and sends information to and receives information from host representation monitor 2840. Flow analysis data storage 2855 receives the flow statistics gathered by flow analyzer 2820. Policy component 2860 enforces network configuration rules based on information received from host representation storage 2850 and information received from flow analysis data storage 2855. Network topology component 2865 identifies routers on the network. Mapping component 2870 assigns detected network devices to subnets. Results reporter 2875 reports policy, network topology, and mapping information to a network reporting mechanism.

In accordance with one embodiment, instructions adapted to be executed by a processor to perform a method are stored on a computer readable medium. The computer-readable medium can be a device that stores digital information. For example, a computer-readable medium includes a read-only memory (e.g., a Compact Disc-ROM ("CD-ROM") as is known in the art for storing software. The computer-readable medium can be accessed by a processor suitable for executing instructions adapted to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Some embodiments relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications.

A system and method in accordance with one embodiment disclosed herein can advantageously improve existing intrusion detection systems or real-time network reporting mechanisms by giving them contextual information about a computer network. Such a system and method is particularly advantageous in comparison to manual methods in that its information is updated automatically. Discovery of the operating systems of both servers and clients is an important advantage over conventional network detection systems. It is advantageous in comparison to active scanning systems in that it is not destructive to the network, it can provide relevant information to an IDS and its information is up to date. It can be used to provide information to enhance intrusion detection systems or to provide continuous real-time reports of the status of the network. It can discover the operating systems of both servers and clients.

In the foregoing detailed description, systems and methods have been described with reference to specific exemplary embodiments. Accordingly, the present specification and figures are to be regarded as illustrative rather than restrictive. The scope of the invention is to be further understood by the claims, and by their equivalents.

The invention claimed is:

1. A method for passively and automatically identifying a client application running on a network device of a network, comprising:

reading a packet transmitted by the network device on the network;

decoding the packet into one or more protocol fields;

comparing the one or more fields to predefined protocol fields which collectively identify a client application, stored in a client application identifying data structure; and storing a client application from the client application identifying structure which has protocol fields that match the protocol fields decoded from the packet as the client application running on the network device.

2. The method of claim 1, wherein the one or more protocol fields comprise an application protocol field.

3. The method of claim 1, wherein the client application comprises an internet browser.

4. The method of claim 3, wherein the one or more protocol fields comprise one or more of a command, a uniform resource location, and a version.

5. The method of claim 1, further comprising verifying one or more response packets that are sent in response to the packet for structure and content.

6. The method of claim 1, further comprising reporting the client application to a network reporting mechanism.

7. The method of claim 6, wherein the network reporting mechanism comprises one or more of an intrusion detection system and a network management system.

8. The method of claim 1, further comprising recording a change to the client application.

9. A method for passively and automatically identifying a client application running on a network device of a network, comprising:

identifying a flow between an initiator network device and a responder network device by reading, decoding, and analyzing two or more packets transmitted on the network;

identifying one or more packets of the flow as one or more initiator packets;

identifying one or more packets of the flow as one or more responder packets;

if protocol fields of the one or more initiator packets match predefined initiator protocol fields which collectively identity the client application and if protocol fields of the one or more responder packets match predefined responder protocol fields which collectively identify the client application, then identifying the client application of the matched protocol fields as a client application running on one of the initiator network device and the responder network device.

10. The method of claim 9, further comprising storing one or more of a client application type, a client application product, and a client application version in a data structure associated with a host of the application.

11. The method of claim 9, wherein the client application initiates a session to a service running an a remote processor.

12. The method of claim 9, wherein the client application comprises an internet web browser.

13. The method of claim 12, wherein the one or more protocol fields comprise one or more of a command, a uniform resource locator, and a version.

14. The method of claim 9, wherein the client application is identified based on a comparison of one or more fields present in a single packet.

15. The method of claim 9, further comprising reporting the client application running on the initiator network device to a network reporting mechanism.

16. The method of claim 15, wherein the network reporting mechanism comprises one or more of an intrusion detection system and a network management system.

17. The method of claim 9, further comprising recording a change to the client application running on the initiator network device.

18. A method for passively and automatically identifying a client application running on a network device of a network, comprising:

maintaining a client application identifying data structure that comprises one or more predefined protocol fields which collectively identify one or more client applications;

identifying a flow between an initiator network device and a responder network device by reading, decoding, and analyzing two or more packets transmitted on the network;

comparing one or more protocol fields of one or more packets of the flow to the one or more predefined protocol fields of the one or more client applications of the client application identifying data structure; and recording a client application from the client application identifying structure which has protocol fields that match the protocol fields of the one or more packets as the client application of the initiator network device.

19. The method of claim 18, further comprising reporting the client application running on the initiator network device to a network reporting mechanism.

20. An apparatus for passively and automatically identifying a client application running on a network device of a network, comprising:

a receiver for receiving a packet transmitted by the network device on the network;

a decoder for decoding the packet into one or more protocol fields;

a processor for comparing the one or more fields to predefined protocol fields which collectively identify a client application, stored in a client application identifying data structure; and a computer-readable medium for storing a matched client application which has protocol fields that match the protocol fields decoded from the packet as the client application running on the network device.

* * * * *